US007573015B2

(12) United States Patent
Kono et al.

(10) Patent No.: US 7,573,015 B2
(45) Date of Patent: Aug. 11, 2009

(54) IMAGE READING DEVICE AND IMAGE READING METHOD

(75) Inventors: Takanobu Kono, Shiojiri (JP); Loi Yew Kien, Singapore (SG)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 12/231,455

(22) Filed: Sep. 3, 2008

(65) Prior Publication Data

US 2009/0057538 A1 Mar. 5, 2009

(30) Foreign Application Priority Data

Sep. 3, 2007 (JP) ............................ 2007-227514

(51) Int. Cl.
*H04N 1/04* (2006.01)

(52) U.S. Cl. .................... 250/208.1; 250/234; 358/475; 358/483; 358/496; 358/497

(58) Field of Classification Search .............. 250/208.1, 250/234; 358/475, 482, 483, 496, 497
See application file for complete search history.

(56) References Cited

U.S. PATENT DOCUMENTS 5,767,979 A 6/1998 Kim
2006/0209360 A1* 9/2006 Sakakibara ................. 358/474
2006/0291009 A1* 12/2006 Tewinkle .................. 358/482
2007/0121175 A1* 5/2007 Futami ..................... 358/474
2007/0127089 A1* 6/2007 Sasaki ...................... 358/483
2007/0188825 A1* 8/2007 Suga ........................ 358/474

FOREIGN PATENT DOCUMENTS

| | | |
|---|---|---|
| JP | 06-178059 | 6/1994 |
| JP | 06-334817 | 12/1994 |
| JP | 07-143285 | 6/1995 |
| JP | 2005-086278 | 3/2005 |
| JP | 2005-203924 | 7/2005 |

* cited by examiner

*Primary Examiner*—John R Lee
(74) *Attorney, Agent, or Firm*—Edwards Angell Palmer & Dodge LLP

(57) ABSTRACT

An image reading device which reads a document as an image includes a light source unit, a light receiving unit, a transporting mechanism which relatively transports either one of the light receiving unit or the document, a light reception control unit, and an irradiation control unit which irradiates the light receiving unit with the light from the document during a first light receiving period starting from a beginning point of the charging period and a second light receiving period ending at an ending point of the charging period and which does not irradiate the light receiving unit with the light from the document between the first light receiving period and the second light receiving period.

6 Claims, 5 Drawing Sheets

TIME t
CLK
SH
DS
CO
LC
t1
t2
t3
t4
t5
t6
t7
t8
ELECTRIC CHARGING PERIOD 1
ELECTRIC CHARGING PERIOD 2
ELECTRIC CHARGING PERIOD 3
ELECTRIC CHARGING PERIOD 4
READING PERIOD 1
READING PERIOD 2
READING PERIOD 3
LIGHTING PERIOD
UNLIGHTING PERIOD

IMAGE READING DEVICE AND IMAGE READING METHOD

The entire disclosure of Japanese Patent Application No. 2007-227514, filed Sep. 3, 2007 is expressly incorporated by reference herein.

BACKGROUND

1. Technical Field

The present invention relates to an image reading device and an image reading method.

2. Related Art

JP-A-1994-178059 disclose an image reading device which reads a document as an image in a manner such that light is emitted from a light source unit having a light source to a document, and reflected light which is light reflected from the document or transmitted light which is light transmitted through the document is inputted in an image sensor. As a light source of the light source unit of the image reading device, a technique using a light emitting diode (LED) is known (for example U.S. Pat. No. 5,767,979).

Generally, an image reading device reads an image by repeatedly performing a series of processes, such as accumulating charges in light receiving elements of an image sensor while transporting the image sensor relative to a document, reading an amount of accumulated charges, and producing image data on the basis of the read amount of accumulated charges. When a resolution is determined, transporting speed of the image sensor and charge accumulating period are determined such that the series of processes can be performed without delay. In the case in which an intensity of light of the LED serving as a light source is strong, if the LED is lighted for the entire time of the charge accumulating period, the light receiving element may be saturated. For this reason, JP-A-2005-203924 discloses a technique in which the LED is lighted for only a predetermined time from a starting point of the charge accumulating period, and then the LED is put out after that.

However, the known technique does not mention the relative transporting speed of the image sensor to the document. Accordingly, if the relative transporting speed of the image sensor to the document changes in the middle of image processing, image quality of the read image is likely to be deteriorated. This problem does not occur only in the case of using the LED as a light source but also commonly arises when using different light sources, such as a fluorescent lamp.

SUMMARY

An advantage of some aspects of the invention is that it provides a technique of suppressing quality deterioration of an image which is read.

According to a first aspect of the invention, there is provided an image reading device for reading a document as an image, which includes a light source unit, a light receiving unit which receives light outputted from the light source unit and arriving by way of the document and accumulates charges according an amount of received light, a transporting mechanism which relatively transports either one of the light receiving unit or the document in a predetermined scanning direction with respect to the other, a light reception control unit which repeatedly performs accumulating charges to the light receiving unit in a predetermined charging period and reading an amount of charges accumulated in the light receiving unit during the transportation, and an irradiation control unit which irradiates the light receiving unit with the light from the document during a first light receiving period starting from a beginning point of the charging period and a second light receiving period ending at an ending point of the charging period and which does not irradiate the light receiving unit with the light from the document between the first light receiving period and the second light receiving period.

According to the image reading device of the first aspect, a period, in which the light receiving unit actually receives light, of the charge accumulating period is divided into a first light receiving period and a second light receiving period. As a result, even if the transporting speed of the light receiving unit relative to the document is changed, it is possible to equalize the average of the transporting speeds in the periods in which the light receiving unit receives light for every charge accumulating period. Accordingly, even in the case in which the transporting speed of the light receiving unit relative to the document varies, it is possible to suppress deterioration of an image which is read.

In the image reading device, there is no problem that wherein the light source unit includes a light emitting diode (LED), and the irradiation control unit is a light source control unit which lights the LED up during the first light receiving period and the second light receiving period and puts the LED out between the first light receiving period and the second light receiving period. With this structure, it is possible to easily realize the above-described irradiation control by controlling lighting and putting out of the LED.

In the image reading device, there is no problem that an ending point of a first charging period and a starting point of a second charging period of a plurality of the charging periods are simultaneous or almost simultaneous, and the light source control unit continuously lights the LED up from beginning of the second light receiving period of the first charging period to ending of the first light receiving period of the second charging period. With this structure, as it is possible to control the number of times of lighting/unlighting of the LED, it is possible to simplify the control and prolong the lifespan of the LED.

In the image reading device, there is no problem that a length of the first light receiving period and a length of the second light receiving period are almost equal to each other. With this structure, it is possible to uniform the average of the transporting speeds in the periods in which the light receiving unit actually receives for every charge accumulating period. Accordingly, even in the case in which the transporting speed of the light receiving unit relative to the document varies, it is possible to suppress deterioration of an image which is read.

In the image reading device, there is no problem that the transporting mechanism has a variance regarding to a transportation speed. With this structure, when the transporting speed varies, it is possible to suppress deterioration of the read image by equalizing the average of the transporting speeds in the period in which the light receiving unit actually receives light for every charge accumulating period.

According to a second aspect of the invention, there is provided an image reading method which reads a document as an image by controlling a light source unit and a light receiving unit which receives light outputted from the light source unit and arriving by way of the document and accumulates charges according to an amount of received light, the image reading method including transporting either one of the light receiving unit or the document relatively in a predetermined scanning direction with respect to the other, accumulating charges to the light receiving unit in the middle of the transportation, irradiating the light receiving unit with the light, which progresses by way of the document, during a first light receiving period starting from beginning of charge accumulation, not irradiating the light receiving unit with the light, which progresses by way of the document, during an light unreceiving period coming after the first light receiving period, irradiating the light receiving unit with the light, which progresses by way of the document, during a second light receiving period coming after the light unreceiving period, reading an amount of charges accumulated in the light receiving unit when the second light receiving period ends, and repeatedly performing the accumulating charges and the reading an amount of charges.

The image reading method according to the second aspect has the same advantages as the image reading device according to the first aspect. The image reading method according to the second aspect can be realized in various forms like the image reading device according to the first aspect.

The invention can be embodied in various forms. For example, the invention may be embodied in the form of a computer program for executing the image reading method according to the second aspect, or a recording medium containing the computer program therein.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments of the invention will be described with reference to the accompanying drawings.

A. Embodiment

Figure 1:
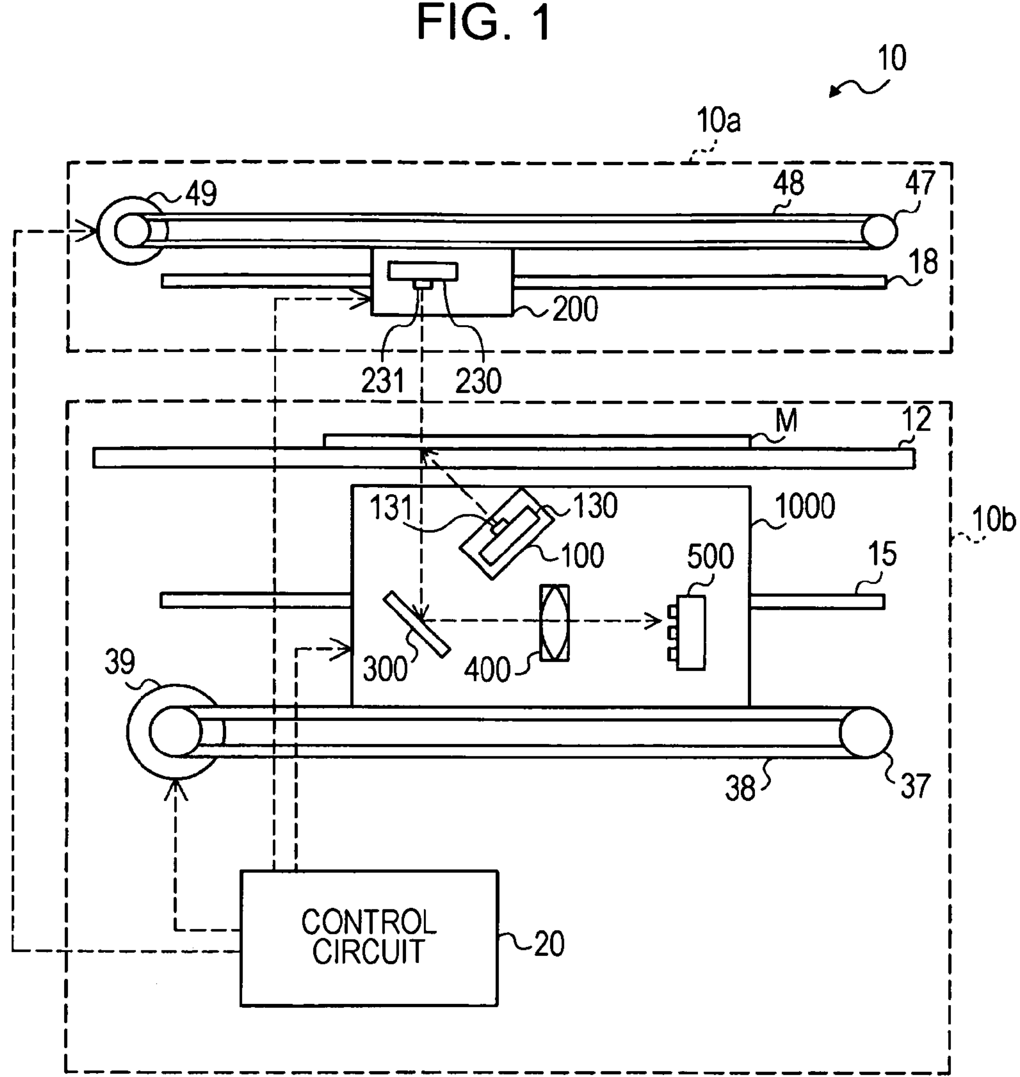
FIG. 1 is a block diagram illustrating the overall structure of a scanner device according to one embodiment of the invention.
Figure 1:
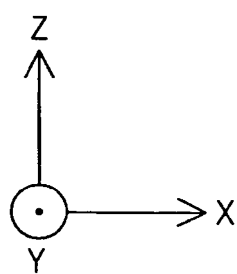
Figure 2:
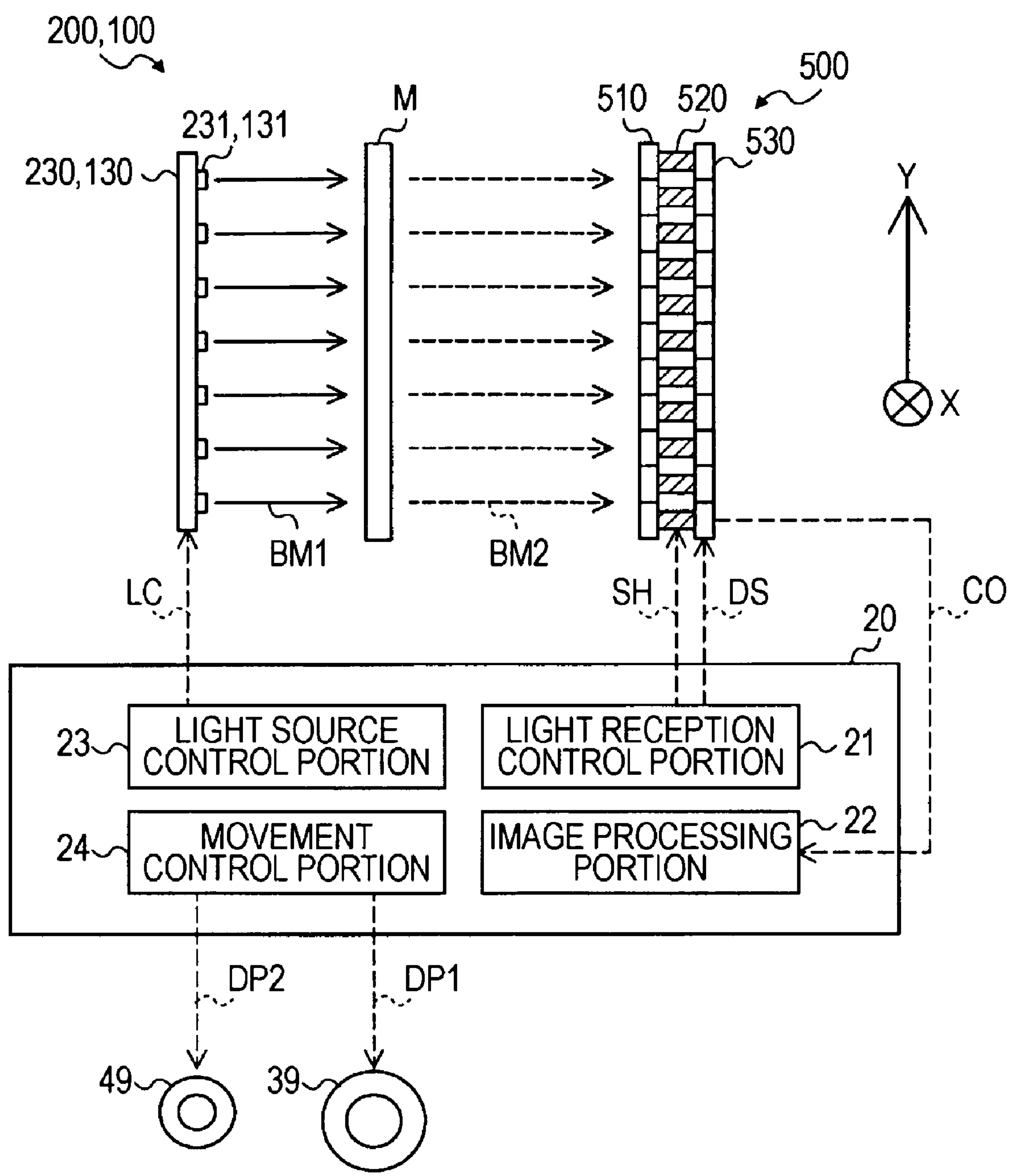
FIG. 2 is a block diagram illustrating the structure of a scanner device 10, and particularly showing a control circuit and an image sensor.

FIG. 1 is a block diagram illustrating the overall structure of a scanner device 10 according to one embodiment of the invention. FIG. 2 shows the structure of the scanner device 10, and particularly shows a control circuit 20 and an image sensor 500 of the scanner device 10. The scanner device 10 consists of a body 10*b* and a cover 10*a*. An upper part of the body 10*b* is provided with a glass substrate 12 having a reading surface on which a document M to be read is placed. The cover 10*a* is arranged so as to cover the glass substrate 12 when performing image reading processing.

The cover 10*a* includes a transparent document oriented light source device 200, a driving motor 49, a pulley 47, a belt 48 engaged with the driving motor 49 and the pulley 47, and a guide shaft 18. The transparent document oriented light source device 200 emits light to a document M when the document M is a transparent medium, such as photographic film (hereinafter, such document M is referred to as transparent document). The transparent document oriented light source device 200 includes a substrate 230 of which a longitudinal direction is Y axis, and a plurality of white LEDs 231 serving as light sources and arranged on the substrate 230 in the Y axis (see FIG. 2). The transparent document oriented light source device 200 is slidably engaged with the guide shaft 18. The transparent document oriented light source device 200 reciprocates in an axial direction (X axis direction of FIG. 1) of the guide shaft 18 as the belt 48 is driven by the driving motor 49.

The body 10*b* includes a carriage 1000 which reads the document M placed on the reading surface of the glass substrate 12 as an image, a driving motor 39, a pulley 37, a belt 38 engaged with the driving motor 39 and the pulley 37, a guide shaft 15, and a control circuit 20.

The carriage 1000 includes a reflective document oriented light source 100, a mirror 300, a lens 400, and an image sensor 500. In the case in which the document M is formed of a reflective medium, such as paper (hereinafter, referred to as a reflective document), the reflective document oriented light source device 100 emits light to the document M. The reflective document oriented light source 100 includes a substrate 130 of which a longitudinal direction is Y axis, and a plurality of white LEDs 131 serving as light sources and arranged on the substrate 130 in the Y axis direction like the transparent document oriented light source device 200.

The light emitted from the light source unit and arriving by way of the document M, i.e. reflected light which is emitted from the reflective document oriented light source device 100 and reflected from the document M, or transmitted light which is emitted from the transparent document oriented light source device 200 and which penetrated through the document M is inputted into the light receiving elements 510 of the image sensor 500 via the mirror 300 and the lens. 400. In FIG. 2, an arrow BM1 schematically shows light which is outputted from the light source and has not yet reach the document M, and an arrow BM2 shows light (reflected light or transmitted light) which is outputted from the light source device and which is reflected from or comes by way of the document M.

The image sensor 500 is a line sensor which outputs a one-dimensional image sensor as a plurality of pixels is arranged in a single row. As shown in FIG. 2, the image sensor 500 includes a plurality of light receiving elements 510, charge coupled devices (CCD) 530, and switches 520 disposed between the corresponding light-receiving elements 510 and the CCDs 530. The light receiving elements 510 correspond to pixels, respectively and are arranged in the Y axis of FIG. 2. The light receiving element 510 is an element which changes the received light into charges and accumulates the charges. For example, a photodiode is used as the light receiving element 510. The CCD 530 is a device for receiving the accumulated charges in the light-receiving elements 510 and sequentially outputting electrical signals. The switch 520 is a switch constituted as a transmission gate. The light receiving element 510 is in an OFF state while the light receiving element 510 accumulates the charges, and is in an ON state while the charges are delivered from the light receiving element 510 to the CCD 530.

The carriage 1000 is slidably engaged with the guide shaft 15. The carriage 1000 reciprocates in an axial direction (X-axis direction of FIG. 1) of the guide shaft 15 as the belt 38 is driven by the driving motor 39.

The control circuit 20 includes a general-purpose computer consisting of a read only memory (ROM), a random access memory (RAM), and a central processing unit (CPU), and a special-purpose processing circuit (not shown), such as an analog front end (AFE) and an image processing chip. The control circuit 20 controls the overall operation of the scanner device 10. As shown in FIG. 2, the control circuit 20 is a functional block realized as the general-purpose computer and the special-purpose processing circuit and includes a light reception control unit 21, an image processing unit 22, a light source control unit 23, and a transportation control unit 24. The control circuit 20 has various functions, such as an inputting unit which receives manipulations of a user, but the detailed description thereof will be omitted.

The light reception control unit 21 controls the image sensor 500. That is, the light reception control unit 21 outputs a shift signal SH and a drive signal DS and thus controls a switch 520 and the CCD 530, respectively.

The image processing unit 22 receives an electric signal CO outputted (read) from the CCD 530. The image processing unit 22 performs noise reduction, amplification, A/D conversion, and digital image processing with respect to the received electric signal CO, and thus produces the digital image data.

The light source control unit 23 lights and controls the white LEDs 231 of the transparent document oriented light source device 200 when reading the transparent document, and lights and controls the white LEDs 131 of the reflective document oriented light source device 100 when reading the reflective document. Control for Lighting and unlighting the white LEDs 231 or the white LEDs 131 is performed using an LED control signal LC. With this embodiment, the white LEDs 131 or the white LEDs 231 are lit up when the LED control signal LC has a high level, and the white LEDs 131 or the white LEDs 231 are lit up when the LED control signal LC has a low level.

The transportation control unit 24 makes the carriage 1000 and the transparent document oriented light source device 200 reciprocate as described above by driving the driving motor 39 and the driving motor 49. The transportation control unit 24 drives the driving motor 39 and the driving motor 49 by supplying a driving signal DP1 and a driving signal DP2 to the driving motors 39 and 49, respectively. The driving motors 39 and 49 are known stepping motors and have a two-phase permanent magnet (PM) type structure.

Operation of Scanner Device 10

Figure 3:
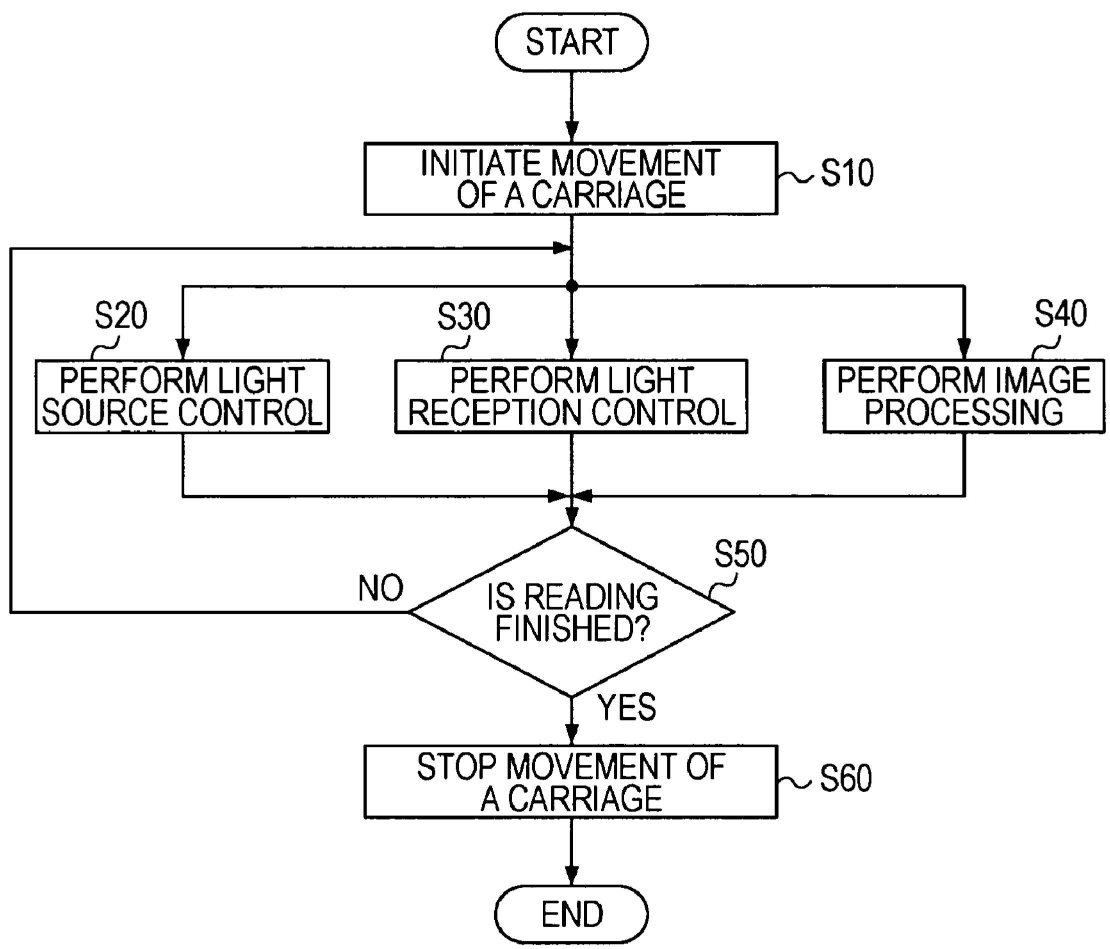
FIG. 3 is a flowchart illustrating steps of an image reading operation of the scanner device.
Figure 4:
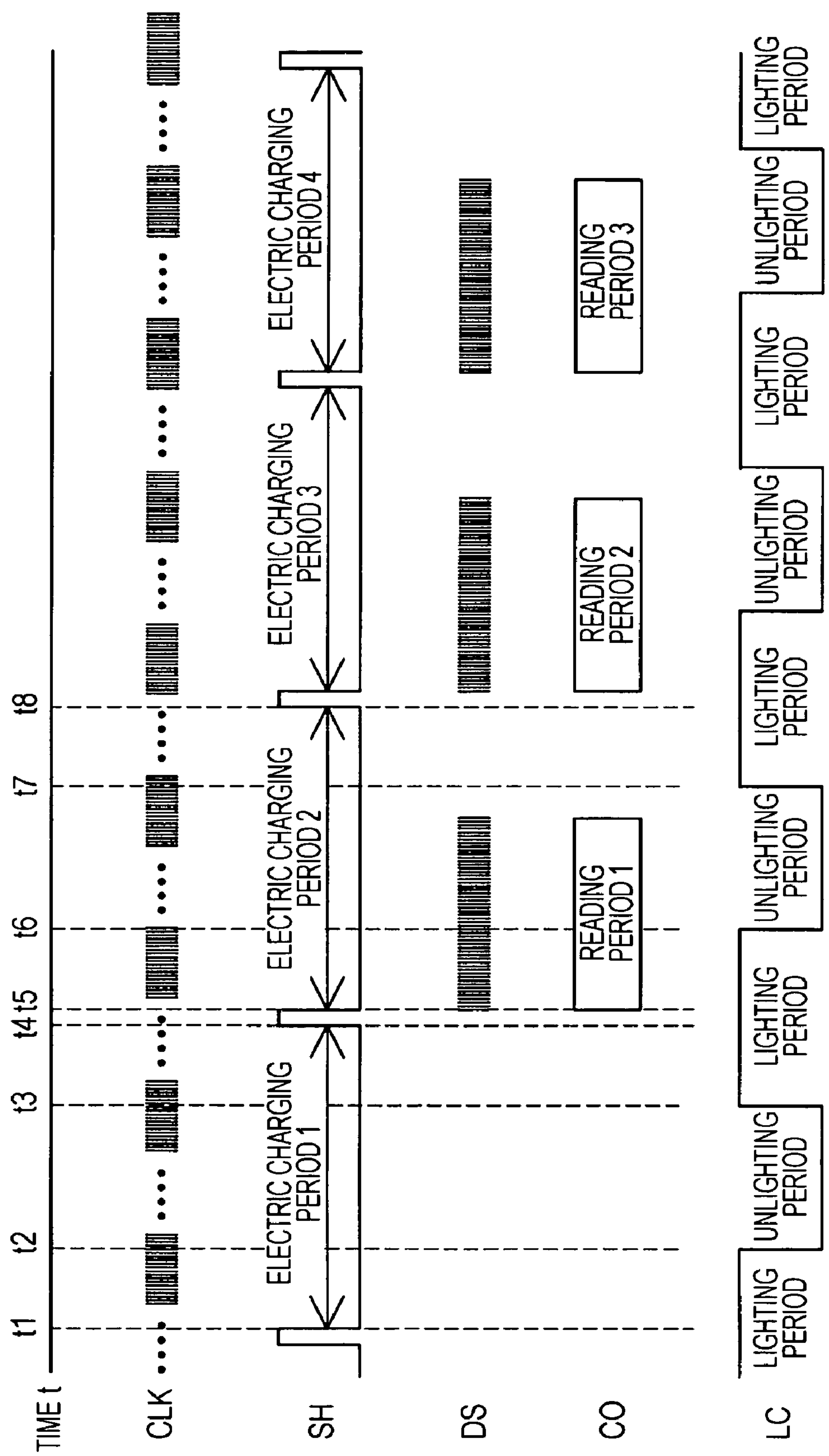
FIG. 4 is a first timing chart for explaining the image reading operation of the scanner device.

With reference to FIG. 3 and FIG. 5, operation of the scanner device 10 will be described. FIG. 3 is a flowchart showing steps of an image reading operation of the scanner device 10. FIG. 4 is a first timing chart for explaining the image reading operation of the scanner device 10. FIG. 5 is a second timing chart for explaining the image reading operation of the scanner device 10.

The image reading operation is an operation of producing image data by reading the document M placed on the glass substrate 12. The image reading operation is started when the control circuit 20 receives an image reading instruction via a manipulation panel or a computer which is connected thereto.

When the image reading operation is started, the transportation control unit 24 of the control circuit 20 initiates to drive the driving motor 39 and to transport the carriage 1000 in a predetermined manipulation direction (step S10). When reading the transparent document, the transportation control unit 24 initiates to drive the driving motor 49 and transports the transparent document oriented light source unit 200 relative to the carriage 1000.

In the middle of transportation of the carriage 1000, the light source control unit 23 performs light source control by lighting or putting out the white LEDs 131 or 231 (step S20), the light reception control unit 21 performs accumulation of charges to the light receiving elements 510 and control of the image sensor 500, such as reading an electric signal from the CCD 530 (light reception control step S30), and the image processing unit 22 performs image processing (step S40) of producing image data on the basis of the signal read from the CCD 530. These steps are performed in parallel with each other.

In the case in which the reading is not finished (step S50: NO), the control unit continuously performs the light source control (step S20), the light reception control (step S30), and the image processing (step S40). Conversely, in the case in which the reading is finished (step S50: YES), the control units stop the light source control (step S20), the light reception control (step S30), and the image processing (step S40). The transportation control unit 24 makes the carriage 1000 stop by stopping the driving motor 39 (step S60). Determination about whether the reading is finished is made on the basis whether the carriage 1000 is moved to a predetermined reading completed position, or whether the carriage 1000 passed through the entire document M. As a result, image data representing the document M is produced.

Hereinafter, the light source control (step S20), the light reception control (step S30), and the image processing (step S40) will be described in detail.

Light Receiving Control

The light reception control 21 generates a shift signal SH which is a pulse signal at a predetermined frequency. At a rising time of the pulse of the shift signal SH, the switch 520 is turned on and the charges of the light receiving element 510 are delivered to the CCD 530. At a falling time of the pulse of the shift signal SH, the charges of the light receiving element 510 are reset, the switch 520 is turned off, and charging is started. That is, a period from falling of a shift signal SH to rising of a next shift signal SH is a charging period in which charges are accumulated in the light receiving element 510. For example, a starting point of the charging period 1 shown in FIG. 4 is t1, and an ending point of the charging period is t4. During the charging period, charges depending on an amount of light received by the light receiving element 510 are accumulated in the light receiving element 510.

The light reception control 21 inputs the drive signal DS to the CCD 530 light after the falling of the shift signal SH, and reads an amount of the charges delivered from each of the light receiving elements 510 to each of the CCDs 530 as an electric signal CO. For example, a reading starting point of the reading period 1 for reading an amount of charges accumulated during the charging period 1 shown in FIG. 4 is t5. The electric signal CO, which is read, is received by the image processing unit 22.

As a result, as shown in FIG. 4, charges accumulated in the light receiving element 510 during the early charging period 1 are read as an electric signal CO of a next charging period 2 (reading period 2). In a similar manner, charges accumulated in the light receiving element 510 during the charging period 2 is read as an electric signal CO of a next charging period 3(reading period 3). In this manner, accumulation of charges to the light receiving elements 510 and reading of the accumulated charges are repeated by taking turns. An image of a reading object line of the document M which is sequentially changed according to the transportation of the carriage 1000 is read as the electric signal CO. As known from the above description, the starting point of a first reading period and the starting point of a second charging period subsequent to the first period are almost simultaneous. For example, the starting point of the reading period 1 and the starting point of the charging period 2 are time t5.

Light Source Control

As an amount of light of the white LED 131 or the white LED 231 is increased according to the reading mode or the kind of document M, the white LED 131 or the white LED 231 is lit up over the entire period of the determined charging period. As a result, if light is received in the light receiving element 510, the light receiving element 510 may be saturated. In such a case, the light source control 23 determines a light receiving time (optimum light receiving time) which is shorter than the charging period. The light source control unit 23 lights the white LEDS 131 or the white LEDs 231 in the optimum light receiving time of the charging period 1, and does not the white LEDs 131 or the white LEDS 231 for the rest time of the charging period 1 (hereinafter, referred to as lighting and unlighting control). As a result, it is possible to control the level of charges accumulated in the light receiving element 510 during the charging period.

When performing the lighting and unlighting control, the light source control unit 23 lights the white LEDs 131 or the white LEDs 231 from the half time of the optimum light receiving period before the rising of the shift signal SH to the half time of the optimum light receiving period after the falling of the shift signal SH. After the half time of the optimum light receiving period passes from the rising of the shift signal SH, during a period from the rising of a next shift signal SH to a midway point of the optimum light receiving period, the white LEDs 131 or the white LEDs 231 are put out. In the same manner, lighting and unlighting of the white LEDs 131 or the white LEDs 231 are repeated.

As shown in FIG. 4, the light source control unit 23 lights the white LEDs 131 or the white LEDs 231 during a period from the time t3 which comes before a second shift signal SH to the time t6 after the current shift signal SH. Further, the light source control unit 23 puts out the white LEDs 131 or the white LEDs 231 during a period from the time t6 to the time t7 which comes before a third shift signal SH.

Figure 5A:
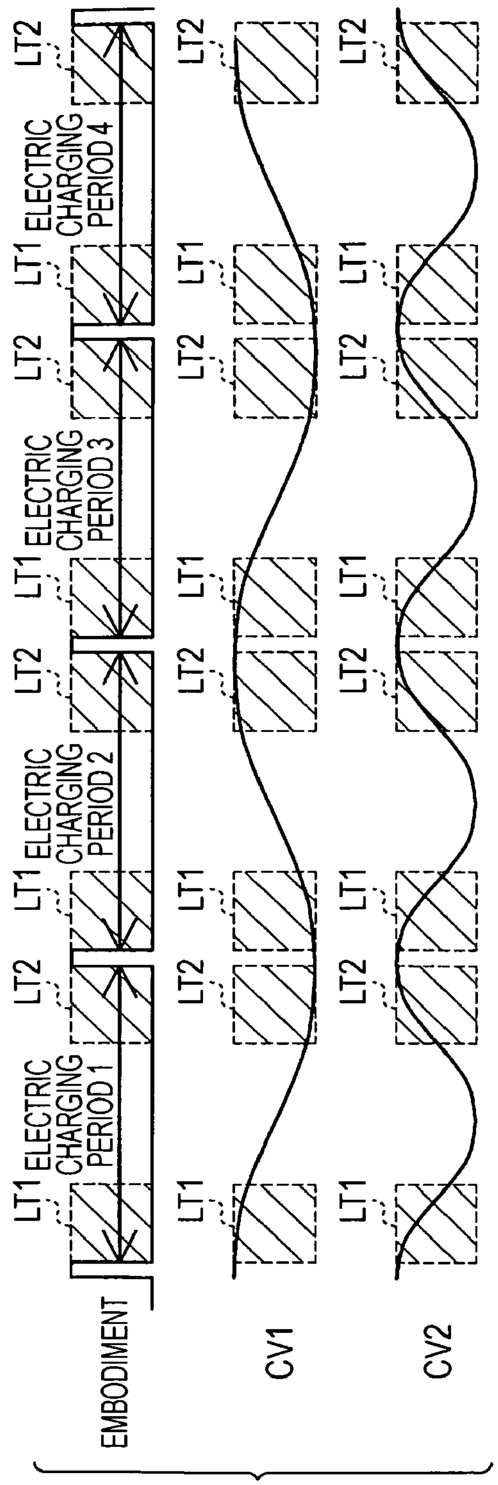
FIG. 5 is a second timing chart for explaining the image reading operation of the scanner device.

As a result, for each charging period, as shown in FIG. 5A, lighting period of the white LED at the optimum light receiving time consists of a first period LT1 beginning from a starting point of the charging period and a second period LT2 ending at an end point of the charging period. In each charging period, the white LEDs 131 or the white LEDs 231 are put out during a period between the first period LT1 and the second period LT2. While the white LED is put out, since the light which is emitted from the white LED and which passed through or is reflected from the document M does not enter the light receiving element 510. Accordingly, a light receiving period, in which charges are actually accumulated in the light receiving element 510, of the charging period consists of the first period LT1 and the second period LT2. Hereinafter, the first period LT1 is called a first light receiving period LT1 and the second period is called a second light receiving period LT2.

Image Processing

The image processing unit 22 receives the electric signal CO read from the CCD 530, sequentially changes the received electric signals CO, and produces line image data consisting of pixel data of a single line. The produced line pixel data is stored in the RAM (not shown) of the control circuit 20. The image processing unit 22 produces the image data by sequentially produces and stores the line image data.

With this embodiment, the period in which each of the charging period actually receives light is divided into an early period and a post period of the charging period. As a result, with this embodiment, in the case in which the transporting speed of the carriage 1000 fluctuates, it is possible to suppress deterioration of image precision of the image. Rotating speed of the stepping motor is likely to fluctuate somewhat by the change of the positional relationship between a magnet of a stator and a magnet of a rotor and time change of control pulses. As a result, the transporting speed of the carriage 1000 transported by the driving motor 39 which is the stepping motor is also likely to fluctuate. Generally, the transporting speed of the carriage 1000 is changed according to the image reading mode (for example, low resolution mode, high resolution mode) and the relationship between the speed fluctuation and the charging period is also changed.

For example, FIG. 5A shows the case in which the transporting speed of the carriage 1000 varies according to a curved line CV1 in the middle of the FIG. 5A. In this case, a difference between hourly speed of one shift signal SH and hourly speed of a next shift signal SH becomes larger. For example, at the beginning of the charging period 1, the transporting speed is high but at ending of a next charging period 2, the transporting speed is low. Even in the case in which the speed varies, in this embodiment, the average speed of the carriage 1000 in the actual light receiving period (shown by hatching) is uniform in the charging periods. As a result, a width of the document M which can be read in the actual light receiving period is substantially equal in each of the charging periods. Accordingly, consistency of the image data read in one charging period and the image data read in a next charging period is maintained and it is possible to suppress deterioration of image quality.

Next, it is possible to image the case in which the transporting speed of the carriage 1000 varies as shown in a curved line CV2 at the bottom of FIG. 5A. In this example, the charging periods has the similar speed pattern in which the speed is relatively high at an early stage and an ending stage of the charging period and the speed is relatively low at a middle stage of the charging period. In even such a case, the average transporting speed of the carriage 1000 is almost equal in every charging period.

Figure 5B:
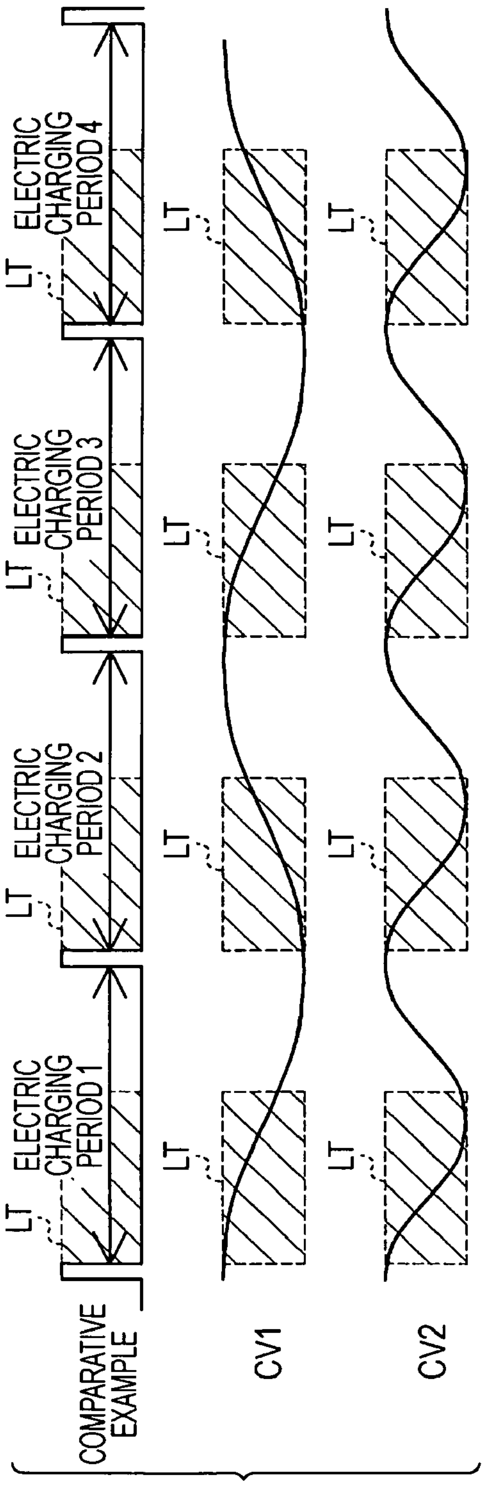

A comparative example is provided in FIG. 5B for better understanding of the invention. As shown in an upper portion of FIG. 5B, in a scanner device of the comparative example, the LED is continuously ON state all over the entire optimum light receiving period LT from the beginning of each of the charging periods, and then is turned off at the ending of the charging period. In this manner, in the case in which the light receiving period of the light receiving element 510 in one charging period is not divided, as shown in a lower portion of FIG. 5B, in the case in which the transporting speed of the carriage 1000 varies according to a curved line CV2, there is no problem. However, when the transporting speed of the carriage 1000 varies according to a curved line CV1 as shown in a middle portion of FIG. 5B, there is a difference between the average speeds of the carriage 1000 in the light receiving periods (period shown by hatching) of charging periods. For example, in FIG. 5B, the average speed 1000 of the carriage 1000 in the light receiving period of the charging period 1 is higher than the average speed of the carriage 1000 in the light receiving period of the charging period 2. As a result, widths of the document M read in the light receiving period are different in the charging period 1 and the charging period 2. Accordingly, consistency of the image data read in the charging period 1 and the image data read in the next charging period 2 is lowered. For example, there is the possibility that jaggy or color unevenness occurs and quality of the image deteriorates.

With this embodiment, even in the case in which the speed unevenness occurs like the curved lines CV1 and CV2, it is possible to suppress deterioration of the image quality.

With this embodiment, an ending point of one charging period and a starting period of a next charging period is almost simultaneous, and the light source control unit 23 continuously lights the white LEDs 131 or the white LEDs 231 from the starting point of the second light receiving period LT2 of one charging period and the ending point of the first light receiving period LT1 of the next charging period. In this embodiment, the light receiving period of the light receiving element 510 in one charging period is divided. However, in the comparative example, the number of control times of lighting or unlighting of the LEDs is not increased. Accordingly, the control by the light receiving control unit 23 is not complicated and lifespan of the LED is not shortened.

Further, with this embodiment, since the lengths of the first light receiving period LT1 and the second light receiving period LT2 are equal to each other, it is possible to effectively divide the light receiving period of the light receiving element 510 in one charging period into an early period and a post period. Accordingly, even in the case in which unevenness of the transporting speed of the carriage 1000 occurs, it is possible to effectively control the image quality deterioration.

B. Modification

With the above-mentioned example, the LED is used as a light source, and lighting/unlighting of the LED is controlled such that light which passed through of is reflected from the document M is irradiated on the light receiving element 510 in the first light receiving period LT1 and the second light receiving period LT2, and the light is not irradiated on the light receiving element 510 between the first light receiving period LT1 and the second light receiving period LT2. However, the invention may be implemented with different structures. For example, an image reading device has a opening and closing mechanism and a shutter which masks light outputted from a light source in a closed state. In this structure, it is possible to divide the light receiving period by controlling opening and closing of the shutter. In such a case, since high response time is not needed like light/unlighting control of the LED, a different lamp such as a fluorescent lamp can be used.

With this embodiment, the transparent document oriented light source device 200 is structured so as to reciprocate in a predetermined scanning direction, but the invention is not limited thereto. The transparent document oriented light source device 200 may be a fixed type.

With this embodiment, the document M is fixed, and the carriage 1000 on which the document is mounted is structured so as to move in a predetermined scanning direction. However, the carriage 1000 may be fixed and the document M may be moved in the predetermined scanning direction by a known document moving device. In other words, various structures in which the document M is moved relative to the carriage 1000 may be used.

The scanner device 10 in the embodiment is constituted as only a scanner machine, but the invention is not limited thereto. The scanner device 10 may be a multifunction device in which a scanner and a plurality of functions, such as a printer are combined, and an image reading unit of a copying machine, an image reading unit of a facsimile. The invention may be applied to devices having a reading function for reading an image of a document such as paper and film.

With this embodiment, part of the structure of the invention which is embodied in hardware may be replaced with software. Conversely, part of the structure of the invention which is embodied in software may be replaced with hardware.

Although embodiments and modifications of the invention are described above, the embodiments are provided for the purpose of helping better understanding of the invention but do not limit the scope of the invention. The invention may include alterations, changes, and modifications of the embodiments without departing from the scope of claims, and also includes equivalents thereof.

What is claimed is:

1. An image reading device which reads a document as an image, comprising:

a light source unit;

a light receiving unit which receives light outputted from the light source unit and arriving by way of the document and accumulates charges according an amount of received light;

a transporting mechanism which relatively transports either one of the light receiving unit or the document in a predetermined scanning direction with respect to the other;

a light reception control unit which repeatedly performs accumulating charges to the light receiving unit in a predetermined charging period and reading an amount of charges accumulated in the light receiving unit during the transportation; and an irradiation control unit which irradiates the light receiving unit with the light from the document during a first light receiving period starting from a beginning point of the charging period and a second light receiving period ending at an ending point of the charging period and which does not irradiate the light receiving unit with the light from the document between the first light receiving period and the second light receiving period.

2. The image reading device according to claim 1, wherein the light source unit includes a light emitting diode (LED), and the irradiation control unit is a light source control unit which lights the LED up during the first light receiving period and the second light receiving period and puts the LED out between the first light receiving period and the second light receiving period.

3. The image reading device according to claim 2, wherein an ending point of a first charging period and a starting point of a second charging period of a plurality of the charging periods are simultaneous or almost simultaneous, and the light source control unit continuously lights the LED up from beginning of the second light receiving period of the first charging period to ending of the first light receiving period of the second charging period.

4. The image reading device according to claim 1, wherein a length of the first light receiving period and a length of the second light receiving period are almost equal to each other.

5. The image reading device according to claim 1, wherein the transporting mechanism has a variance regarding to a transportation speed.

6. An image reading method which reads a document as an image by controlling a light source unit and a light receiving unit which receives light outputted from the light source unit and arriving by way of the document and accumulates charges according to an amount of received light, comprising:

transporting either one of the light receiving unit or the document relatively in a predetermined scanning direction with respect to the other;

accumulating charges to the light receiving unit in the middle of the transportation;

irradiating the light receiving unit with the light, which progresses by way of the document, during a first light receiving period starting from beginning of charge accumulation;

not irradiating the light receiving unit with the light, which progresses by way of the document, during an light unreceiving period coming after the first light receiving period;

irradiating the light receiving unit with the light, which progresses by way of the document, during a second light receiving period coming after the light unreceiving period;

reading an amount of charges accumulated in the light receiving unit when the second light receiving period ends; and repeatedly performing the accumulating charges and the reading an amount of charges.

* * * * *